US012611827B2

(12) United States Patent  
Costle et al.

(10) Patent No.: US 12,611,827 B2  
(45) Date of Patent: Apr. 28, 2026

(54) SEALANT BOTTLE CAP

(71) Applicant: ILLINOIS TOOL WORKS INC., Glenview, IL (US)

(72) Inventors: Carey Christopher Costle, Tucson, AZ (US); Stephen Edward Richey, Greenville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 90 days.

(21) Appl. No.: 17/316,324

(22) Filed: May 10, 2021

(65) Prior Publication Data

US 2021/0354408 A1 Nov. 18, 2021

Related U.S. Application Data

(60) Provisional application No. 63/026,514, filed on May 18, 2020.

(51) Int. Cl.  
B29C 73/16 (2006.01)

(52) U.S. Cl.  
CPC .................................. B29C 73/166 (2013.01)

(58) Field of Classification Search  
CPC .............................. B29C 73/166; B65D 23/12  
USPC .......................................................... 141/388  
See application file for complete search history.

(56) References Cited

U.S. PATENT DOCUMENTS

| | | | | |
|---|---|---|---|---|
| 2,384,174 A | * | 9/1945 | Jones ......................... | B60S 5/04 |
| | | | | 222/530 |
| 4,096,974 A | | 6/1978 | Haber et al. | |
| 4,684,032 A | * | 8/1987 | Tsay ..................... | A47J 41/0027 |
| | | | | 215/12.1 |
| 6,260,739 B1 | * | 7/2001 | Hsiao .................... | B65D 83/205 |
| | | | | 137/355.28 |
| 9,242,416 B1 | * | 1/2016 | Ohm ...................... | B29C 73/166 |
| 10,883,610 B1 | * | 1/2021 | Hsiao .................... | B29C 73/166 |
| 2006/0086403 A1 | * | 4/2006 | Kant .......................... | B60S 5/04 |
| | | | | 141/38 |
| 2009/0193937 A1 | | 8/2009 | Steele et al. | |
| 2013/0138146 A1 | | 5/2013 | Kojima et al. | |
| 2014/0166155 A1 | | 6/2014 | Paasch | |
| 2016/0332397 A1 | * | 11/2016 | Marini ................. | B65D 83/303 |
| 2019/0071278 A1 | * | 3/2019 | Liang ..................... | B65H 75/28 |

FOREIGN PATENT DOCUMENTS

| | | |
|---|---|---|
| JP | S57-204256 A | 12/1982 |
| WO | WO 2018/045548 A1 | 3/2018 |

OTHER PUBLICATIONS

EPO, English language version of the extended European search report for European Patent Application 21173728.3 (8 pages).  
EPO, Exam Report for European Patent Application 21173728.3 (5 pages).

* cited by examiner

*Primary Examiner* — Christopher M Afful  
(74) *Attorney, Agent, or Firm* — McAndrews, Held & Malloy, Ltd.

(57) ABSTRACT

An apparatus and method for a cap for dispensing sealant from a pressurized bottle, to a tire stem valve, includes a cap body, a hose positioned within the cap body where the hose is configured to wrap around at least one storage groove inside a circumference of the cap. The at least one storage groove is helical and the cap also includes a diameter of the cap body where the diameter includes a length of the hose wrapped around the at least one storage groove.

20 Claims, 6 Drawing Sheets

100

100

SEALANT BOTTLE CAP

CROSS REFERENCE TO RELATED APPLICATION

This application claims the benefit of U.S. Provisional Application, Ser. No. 63/026,514, filed on 18 May 2020. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates to a device for releasing tire sealant from a container, to a tire, by means of a pressure source with the use of an integrated hose.

Description of Prior Art

Tire repair devices are primarily used for introducing air and/or tire sealant into defective tires when a flat tire occurs and for sealing a defective tire. Current devices include cans of pressurized air and/or sealant with a can topper and removable upper cap adapted to connect to a tire stem with an optional hose and inject the can contents into the tire. Such current devices are commonly found to have a short hose in which the entire can hangs from a tire valve stem during use.

SUMMARY OF THE INVENTION

The present invention provides an apparatus for a cap of a pressurized bottle, including a hose for releasing contents of the bottle. The apparatus of this invention includes storage for the hose integrated within the cap so that the hose may be wrapped around a circumference of the cap. The apparatus of this invention includes incorporating one or more helical storage grooves to secure the hose within the cap, eliminating any bulk or excess hose protruding beyond a diameter of the pressurized bottle.

The hose includes a length that is adapted to extend a distance from the pressurized bottle to attach to a tire stem valve. The hose also includes a stem end that is configured to attach to the tire stem valve. The length of the hose is sufficient to extend the distance from the pressurized bottle to the tire stem valve without movement of the bottle.

The invention may also include an end opposite the stem end of the hose configured to attach to an opening of a depressor button on the cap body in communication with the pressurized bottle. The length of the hose is configured to wrap around the at lest one storage groove inside a circumference of the cap. The cap also includes a diameter when the length of the hose is wrapped around the at least one storage groove. The diameter of the cap is unchanged when the length of the hose is extended the distance from the bottle to the tire stem valve. The cap also includes a cone side wall. The cone side wall includes a lip where the stem end of the hose is accessible from the lip. The at least one storage groove is integrated into the cone side wall.

DESCRIPTION OF PREFERRED EMBODIMENTS

Figure 1A:
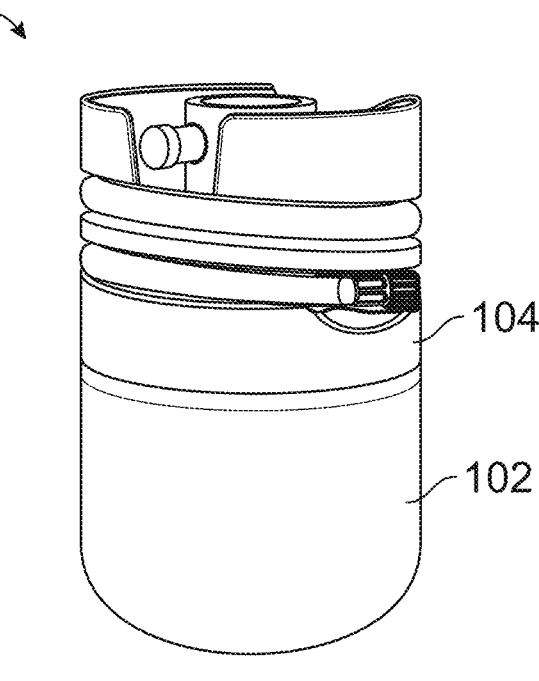
FIG. 1A is a perspective view of a cap for dispensing sealant from a pressurized bottle, according to one embodiment of the invention.
Figure 1B:
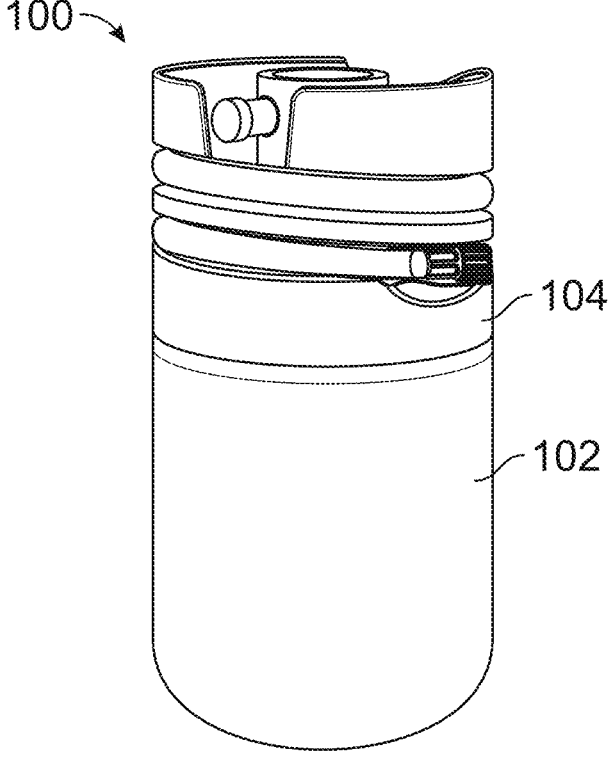
FIG. 1B is a perspective view of a cap for dispensing sealant from a pressurized bottle, according to another embodiment of the invention.

FIGS. 1A-B show a cap device 100 for dispensing pressurized air and/or sealant from a pressurized bottle 102 or can of various sizes. The pressurized bottle 102 includes, without limitation, pressurized air and/or sealant material to be dispensed via the device, such as into a low, flat or otherwise defective tire.

FIGS. 2-5 show a device for dispensing pressurized air and/or sealant from a pressurized bottle 102. The cap 100 for dispensing pressurized air and/or sealant from a pressurized bottle 102 includes a cap body 104 that fits on an end of the pressurized bottle 102. As shown in FIGS. 1A and 1B, the pressurized bottle 102 may vary in size. The cap 100 is adapted for use with any necessary volume capacity for a pressurized bottle needed to fill a tire. The capacity of the pressurized bottle 102 may vary based on tire size. Regardless of the tire size or volume capacity, the cap 100 is able to fit and be used with any suitable pressurized bottle 102 size and compatible tire size.

Figure 2:
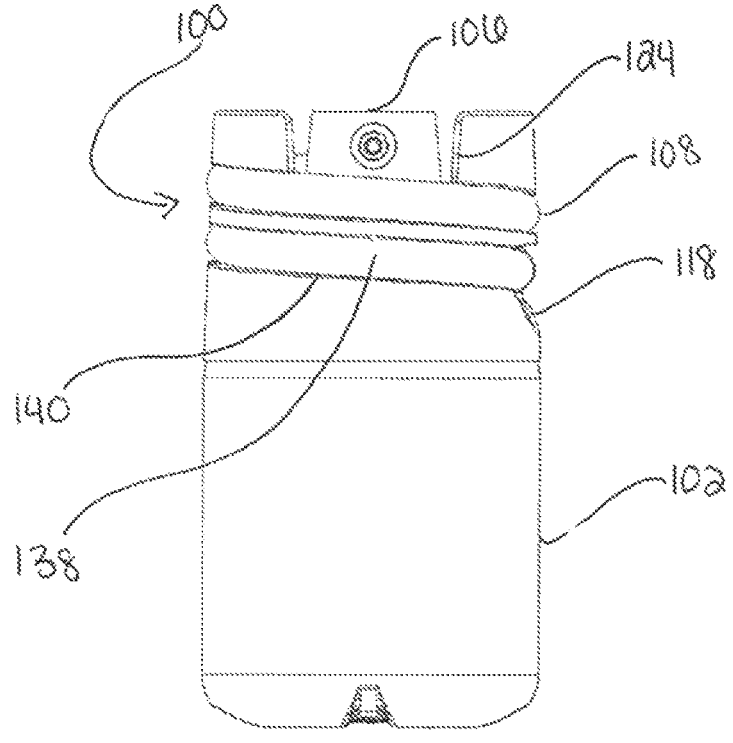
FIG. 2 is a back view of the cap for dispensing sealant from the pressurized bottle, according to the embodiment of FIG. 1B.
Figure 3:
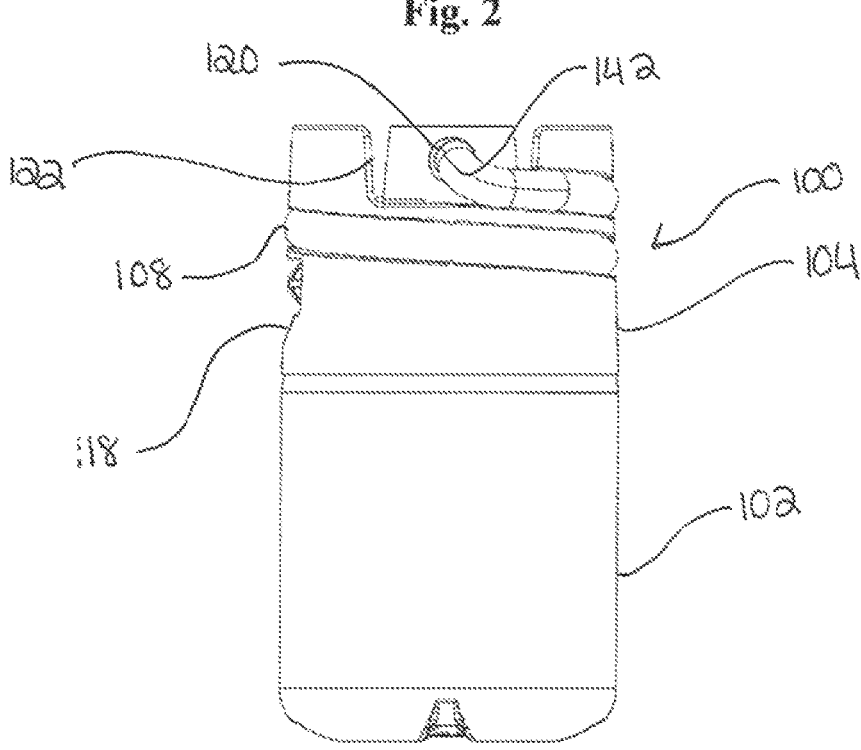
FIG. 3 is a front view of the cap for dispensing sealant from the pressurized bottle, according to the embodiment of FIG. 1B.

The cap body 104 as shown in FIG. 2 includes a depressor button 106. As shown in FIG. 3, the depressor button 106 is connected to a hose 108. A length 138 of the hose 108 is wrapped around at least one storage groove 140 of the cap body 104 to allow for simple storage of the hose 108 within the cap body 104 so that the entire cap device 100 is self-contained (further shown in FIG. 5).

Figure 4:
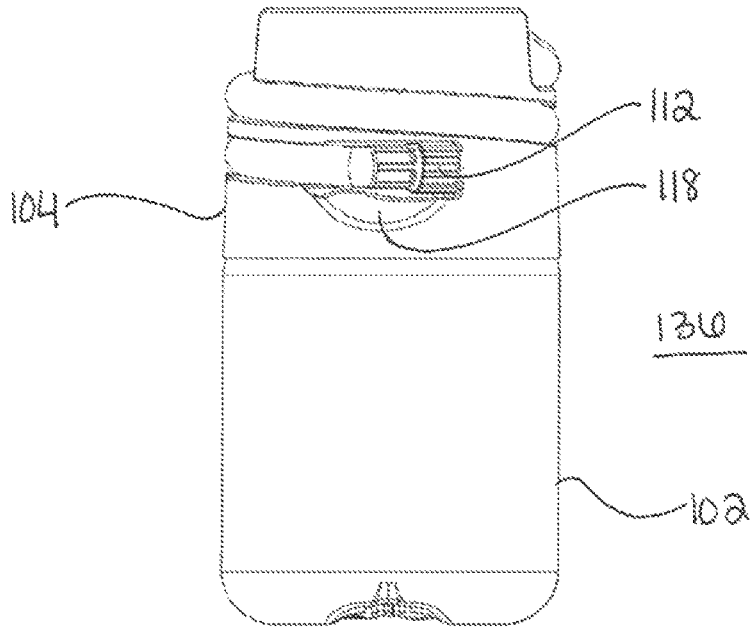
FIG. 4 is a side view of the cap for dispensing sealant from the pressurized bottle, according to the embodiment of FIG. 1B.
Figure 6:
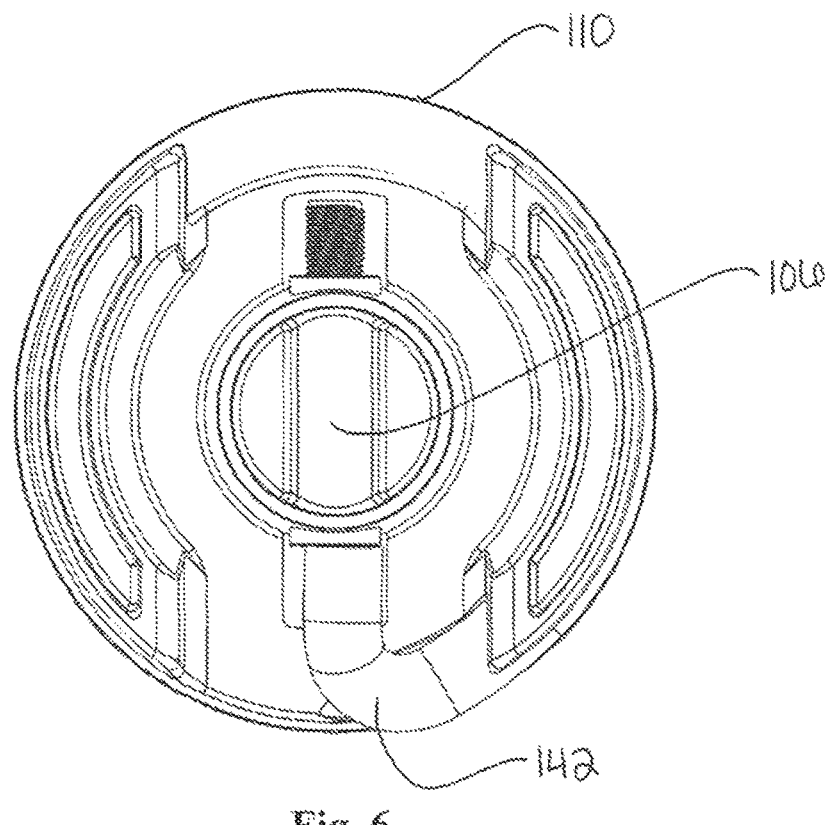
FIG. 6 is a top view of the cap according to the embodiment of FIG. 1B.

As shown in FIG. 4, the hose 108 contains a stem end 112. The stem end 112 is adapted to connect to a tire stem valve 136 where contents of the pressurized bottle 102 may be expelled into the tire. The stem end 112 includes the necessary size and connection elements (e.g., internal threads) for attachment to a tire stem valve 136. The stem end 112 components thereof, can vary in size, shape, amount, and/or configuration, depending on need. As shown in FIG. 3 and FIG. 6, the hose 108 also has an end 142 opposite the stem end 112 which is adapted to attach to an opening 120 of the depressor button 106.

Figure 5:
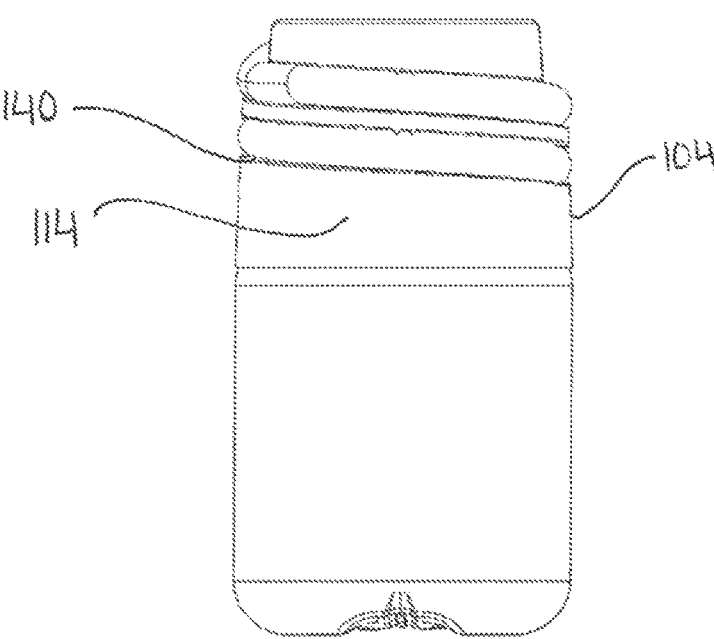
FIG. 5 is a side view opposite the side view of FIG. 4 of the cap for dispensing sealant from the pressurized bottle, according to the embodiment of FIG. 1B.
Figure 8:
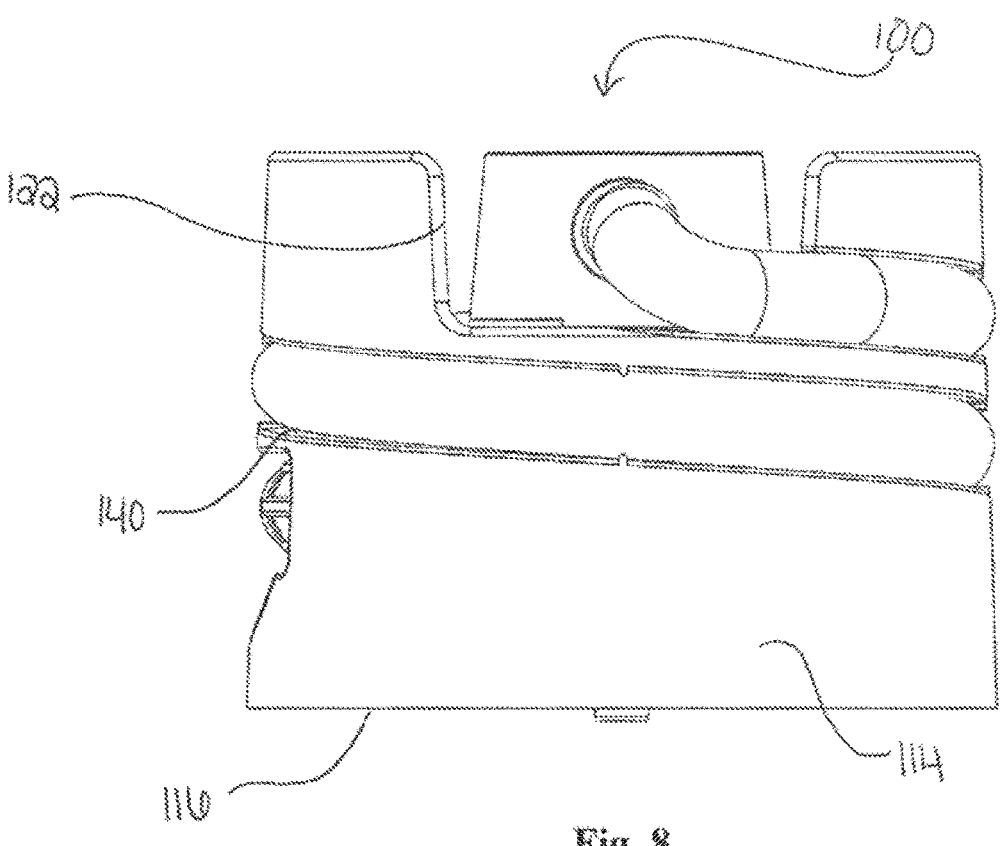
FIG. 8 is a front view of the cap according to the embodiment of FIG. 1B.
Figure 9:
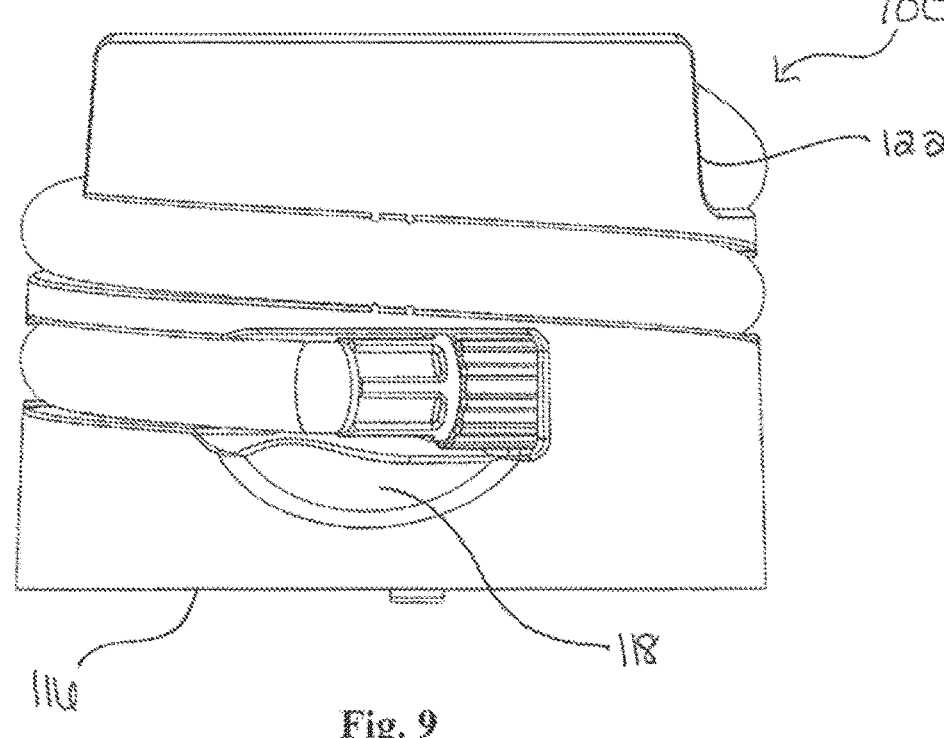
FIG. 9 is a side view of the cap according to the embodiment of FIG. 1B.
Figure 10:
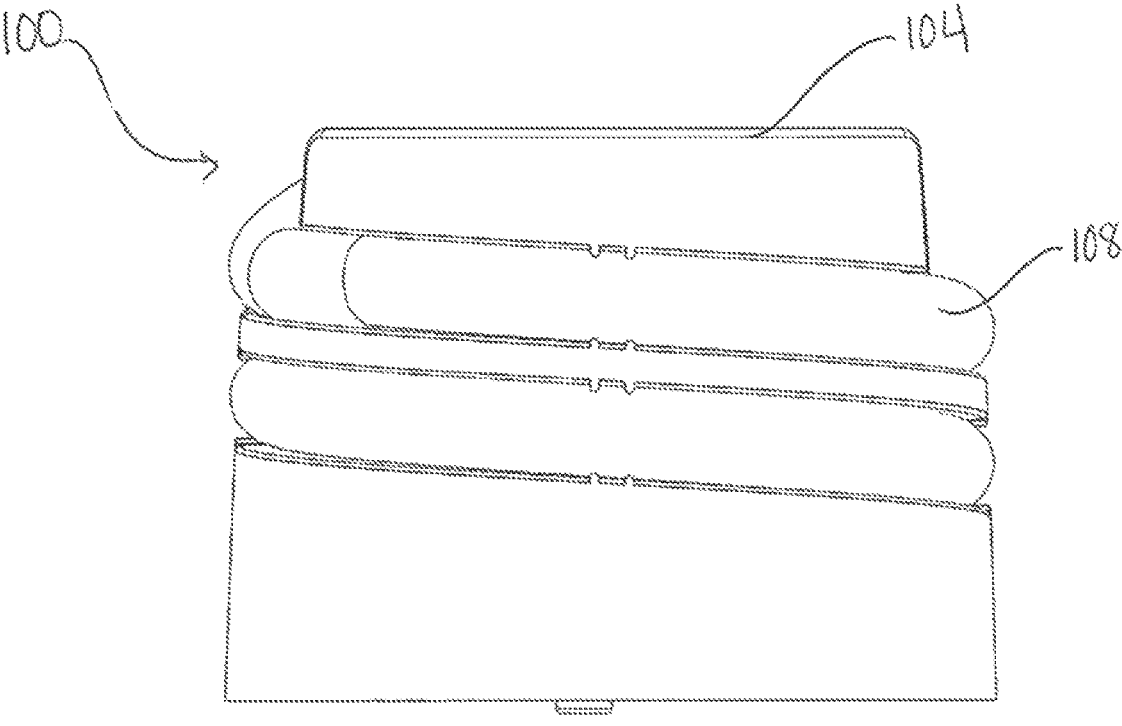
FIG. 10 is a side view opposite the side view of FIG. 9 of the cap according to the embodiment of FIG. 1B.

FIG. 5 shows the cap body 104 further comprising a cone side wall 114. The cone side wall 114 allows multiple cap bodies 104 to be stacked on top of one another for ease and improved use of space in packaging the device 100. The cone side wall 114 allows the device 100 to be stackable in its manufactured state as further shown in FIGS. 8-10, separate from the bottle 102.

As shown throughout the figures, the cone side wall 114 has a front wall cut out 122 and a symmetrical rear wall cut out 124 opposite the front wall cut out 122. In one embodiment the cone side wall 114 may also contain a lip 118. The lip 118 is located near the stem end 112 of the hose 108. The lip 118 allows for access to the stem end 112 of the hose 108 to remove the length 138 of the hose 108 from the cap 100 for use with a tire stem. The at least one storage groove 140 may also be integrated into the cone side wall 114 of the cap 100. The at least one storage groove 140 allows the hose 108 to be positioned in a ring around a circumference 110 of the cone side wall 114 so that the hose 108 may be contained within the cap body 104 of the cap 100, while the hose 108 may also be accessed for removal of the hose 108 to be extended to reach the stem valve 136 of a tire.

The at least one storage groove 140 may be helical. That is, the at least one storage groove 140 may wrap around the circumference 110 of the cone side wall 114 in a spiral nature. In one embodiment, the at least one helical storage groove 140 may wrap around the cone side wall 114 at least 360°. The groove 140 may wrap more or less around the cone side wall 114 depending on the length 138 of the hose 108. In one embodiment, there may be multiple storage grooves 140 to accommodate a longer hose 108. The quantity of storage grooves 140 is fully adaptable in relation to the number of storage grooves 140 needed to allow the entire length 138 of the hose 108 to seamlessly wrap around the cap body 104 in a circular or spiral nature. In one such embodiment, multiple helical storage grooves 140 may wrap around the cone side wall 114 at least 720°. The at least one helical storage groove 140 may begin and terminate at various places throughout the cone side wall 114 so as to form a helix on the side wall 114 that accurately represents the length 138 of the hose 108 of each embodiment.

In various embodiments, the lip 118 may be present at the termination of the at least one storage groove 140. This termination point may also coincide with the stem end 112 of the hose 108. Therefore, the stem end 112 may be accessed via the lip 118 and un-wrapped from the at least one storage groove 140.

The hose 108 is secured in this wrapped position, against an inner surface of the at least one storage groove 140 as a part of the side wall 114. The hose 108 may be freely stored in the at least one storage groove 140. In another embodiment the hose 108 may be stored in the at least one storage groove 140 by any suitable securing element. Such a securing element may be in the form of snaps, rubber, or any other reasonable material with adhesive and/or elastic properties that may secure the hose 108 in place while also allowing removal of the hose 108 from the cap 100 with minimal difficulty. The hose 108 may be partially removed for use by extending the stem end 112 to meet the tire stem of a defective tire with the necessary size and connection elements (e.g., internal threads) for attachment to a tire stem valve 136.

The stem end 112 is adapted to fit onto a tire stem valve 136. It may be of a variety of shapes, sizes and colors to fit on any tire stem valve and is securable to said valve via threads. While this embodiment utilizes threads, the stem end 112 may be adapted to fit onto a tire stem valve 136 via snaps, rubber, or any other reasonable material with adhesive and/or elastic properties that may attach to a tire stem valve 136 and withstand outdoor elements. When the hose 108 is removed from the at least one storage groove 140, the length 138 is able to extend from the end 142 opposite the stem end 112 on the cap body 104, to a tire stem valve 136 without disturbing the pressurized bottle 102. In this embodiment the cap 100 is able to function by delivering sealant to a defective tire without needing to hang the device from the tire stem valve 136. The length 138 of the hose 108 may be adapted for a length needed in order for the hose 108 to reach a tire stem valve 136 of any sized tire without moving the pressurized bottle 102.

In one embodiment, as shown in FIGS. 6-10, the cap 100 further comprises a diameter 116. The diameter 116 is apparent when the hose 108 is wrapped around the at least one storage groove 140 and also when the hose 108 is extended from the cap body 104 to a tire stem valve 136. In this embodiment, the diameter 116 of the cap 100 is unchanged whether the hose 108 is wrapped or extended. This is due in part to the at least one storage groove 140 which may be indented into the cone side wall 114 of the cap body 104. The indentation may account for the exact size of the hose 108 so as to accommodate the hose 108 without affecting the diameter 116 of the cap 100. The unchanged diameter 116 allows for multiple caps 100 to be stacked in a manufactured state, with or without the hose 108, which further allows for ease of storage of multiple caps 100.

Figure 7:
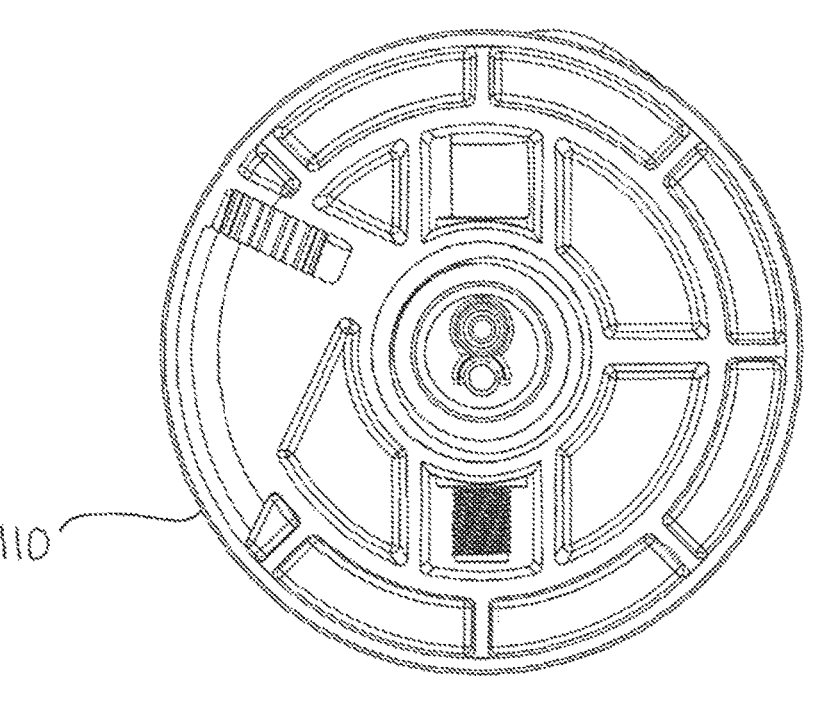
FIG. 7 is a bottom view of the cap according to the embodiment of FIG. 1B.

FIG. 6 shows a top view of the cap 100 whereby the end 142 opposite the stem end 112 of the hose 108 is shown from the opening 120 of the depressor button 106. FIG. 7 shows a bottom view of the cap 100 where an underside of the depressor button 106 is configured for fluid communication with contents of the pressurized bottle 102. In another embodiment, the depressor button 106 may be an alternative form to release contents of the pressurized bottle 102. Contents may be released from the bottle via a valve, lever, switch, cap, threaded top, or any other reasonable means so as to control the flow of the sealant or other contents of the pressurized bottle 102 from the bottle 102, through the hose 108, to a defective tire.

While in the foregoing specification this invention has been described in relation to certain preferred embodiments thereof, and many details have been set forth for purpose of illustration, it will be apparent to those skilled in the art that the device and placard are susceptible to additional embodiments and that certain of the details described herein can be varied considerably without departing from the basic principles of the invention.

What is claimed is:

1. A removable cap for dispensing sealant from a pressurized bottle, the removable cap comprising:

a cap body with a side wall, wherein the cap body is configured to removably couple with the pressurized bottle such that the cap body is statically-fixed relative to the pressurized bottle;

a hose configured to fluidically couple with the pressurized bottle via the cap body to deliver the sealant; and at least one helical storage groove integrally formed in and around an exterior of the side wall of the cap body, wherein the at least one helical storage groove is configured to secure the hose within the side wall of the cap body, wherein the cap body comprises a diameter when the hose is wrapped exclusively around the at least one helical storage groove, and wherein the hose does not contribute to the diameter of the cap body.

2. The removable cap according to claim 1, wherein the at least one helical storage groove extends at least 360 degrees.

3. The removable cap according to claim 2, the hose further comprising a length adapted to extend a distance from the pressurized bottle to attach to a tire stem valve.

4. The removable cap according to claim 3, wherein the hose further comprises a stem end configured to attach to the tire stem valve.

5. The removable cap according to claim 4, wherein the length of the hose is sufficient to extend the distance from the pressurized bottle to the tire stem valve without movement of the bottle.

6. The removable cap according to claim 4, wherein an end opposite the stem end of the hose is configured to attach to an opening of a depressor button in communication with the pressurized bottle.

7. The removable cap according to claim 1, wherein a length of the hose is configured to wrap around the at least one helical storage groove inside a circumference of the cap.

8. The removable cap according to claim 7, wherein the diameter of the cap is unchanged when the length of the hose is extended the distance from the bottle to a tire stem valve.

9. The removable cap according to claim 1, wherein the side wall is a conical side wall.

10. The removable cap according to claim 9, wherein the conical side wall comprises a lip wherein a stem end of the hose is accessible from the lip.

11. The removable cap according to claim 9, wherein the at least one helical storage groove is recessed into the conical side wall.

12. A removable cap for dispensing sealant from a pressurized bottle to a tire stem valve, the cap comprising:
    a cap body having a conical side wall;
    a hose positioned exclusively around an outer perimeter of the cap body,
        wherein the hose is configured to wrap around at least one storage groove inside a circumference of the cap, and integrated into the conical side wall, and
    wherein a diameter of the cap body is unchanged when a length of the hose is wrapped around the at least one storage groove.

13. The cap according to claim 12, wherein the length of the hose is adapted to extend a distance from the bottle to attach to the tire stem valve.

14. The cap according to claim 13, wherein the length of the hose is sufficient to extend the distance from the bottle to the tire stem valve without movement of the bottle.

15. The cap according to claim 12, wherein the diameter is unchanged when the length of the hose is extended the distance from the bottle to the tire stem valve.

16. The cap according to claim 12, wherein the at least one storage groove is integrated into the conical side wall.

17. The cap according to claim 16, wherein the conical side wall comprises a lip.

18. The cap according to claim 17, wherein a stem end of the hose is accessible when wrapped around the at least one storage groove from the lip.

19. The cap according to claim 12, wherein the conical side wall is configured to stack over or under a conical side wall of another cap.

20. A removable cap for dispensing sealant from a pressurized bottle, the removable cap comprising:
    a cap body having a side wall, wherein the cap body is configured to removably couple with the pressurized bottle such that the cap body is fixed relative to the pressurized bottle;
    a hose configured to fluidically couple with the pressurized bottle via the cap body to deliver the sealant; and
    at least one helical storage groove integrally-formed around an exterior surface of the side wall of the cap body,
        wherein the at least one helical storage groove is recessed into the side wall and configured to secure the hose within the exterior surface of the side wall of the cap body,
        wherein the cap body comprises a diameter when the hose is wrapped more than 360 degrees around the at least one helical storage groove, and
        wherein the hose does not contribute to the diameter of the cap body.

* * * * *